United States Patent Office 2,720,527
Patented Oct. 11, 1955

2,720,527

SYNTHESIS OF BIOCYTIN

Donald E. Wolf, Princeton, and Karl Folkers and Robert L. Peck, Plainfield, N. J., assignors to Merck & Co., Inc., Rahway, N. J., a corporation of New Jersey No Drawing. Application October 12, 1951,
Serial No. 251,134

4 Claims. (Cl. 260—299)

This invention relates to a novel process for the preparation of ε-N-(D-biotinyl)-L-lysine, also known as biocytin.

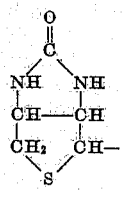

Biocytin is a growth-promoting substance related to biotin. Heretofore, it has been isolated from such sources as autolyzed yeast extracts. However, this procedure is long and tedious and furnishes only minute quantities of biocytin relative to the amount of starting material.

It is an object of our invention to provide a process for the preparation of ε-N-(D-biotinyl)-L-lysine from readily available starting materials.

Regarded in certain of its broader aspects the process in accordance with our invention involves condensing L-lysine copper complex with biotin acid halide in the presence of a condensing agent to form ε-N-(D-biotinyl)-L-lysine copper complex, acidifying the reaction mixture thus obtained, removing the copper as an insoluble solt, and recovering ε-N-(D-biotinyl)-L-lysine.

In preparing ε-N-(D-biotinyl)-L-lysine (biocytin) we utilize as one of the starting materials L-lysine copper complex. Although the structure of the complex is not definitely established at the present time, it is believed to be represented by the following formula:

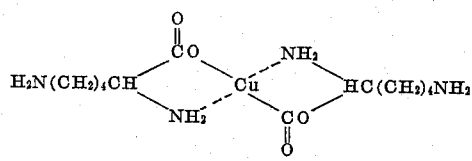

The above compound may be prepared by reacting a mono-mineral acid salt of L-lysine, such as L-lysine monohydrochloride, with a basic solution of a copper salt. Copper sulfate or copper oxide may be employed in this reaction; however, we prefer to use copper carbonate. The preparation of L-lysine copper complex is reported by Neuberger and Sanger in the Biochemical Journal 37: 515 (1943).

We have found that the L-lysine copper complex described above may be condensed with biotin acid halide having the structural formula

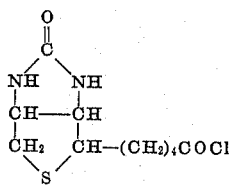

Condensation of lysine copper complex and biotin acid halide is carried out in the presence of an alkaline condensing agent, such as aqueous alkali or alkaline earth metal hydroxide solutions, pyridine, and the like. It is preferred to introduce the biotin acid halide in chloroform solution. However, water immiscible solvents other than chloroform may be employed for this purpose, provided they contain no hydroxyl or amino groups which would react with the acid halide. Such solvents as ether and benzene would be suitable. The copper complex of lysine is soluble in the aqueous phase of the reaction mixture. The condensation is carried out at a pH of about 8 by the addition of sufficient base.

The condensation reaction results in the formation of ε-N-(D-biotinyl)-L-lysine copper complex which is believed to have the following formula:

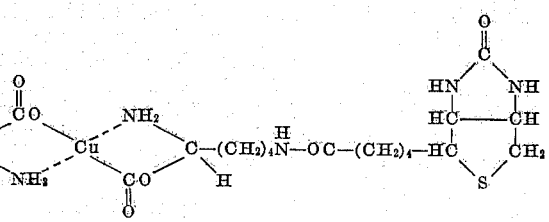

The ε-N-(D-biotinyl)-L-lysine copper complex is decomposed by treating said compound with acid and removing the copper as an insoluble salt. We prefer to introduce hydrogen sulfide into the acidified mixture to effect the latter step. Removal of the precipitated copper sulfide leaves an aqueous solution of ε-N-(D-biotinyl)-L-lysine having the structural formula:

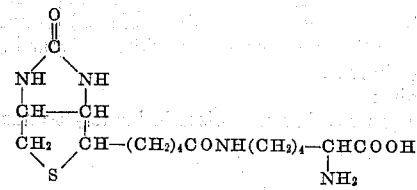

This latter product may be recovered by conventional procedures.

It is, of course, possible to apply our synthesis to the D- or DL- form of lysine. L-lysine was employed in the present instance since we wished to obtain the natural form of biocytin as the end product of the reaction.

The following example illustrates specific embodiments of our invention:

EXAMPLE

Preparation of ε-N-(D-biotinyl)-L-lysine

To a boiling aqueous solution of 1.64 g. of L-lysine monohydrochloride was added an excess of solid copper carbonate. The blue solution was cooled in ice and filtered. This preparation of the L-lysine copper complex is reported in Biochemical Journal 37: 515 (1943). The filtrate was cooled to about −15° C. in an ice salt bath, and a chloroform suspension of biotin acid chloride, prepared from 1.0 g. of D-biotin, was added in portions over a fifteen minute period. The pH was adjusted to above pH 8 by the addition of sufficient 2.5N sodium hydroxide solution. The mixture was stirred vigorously throughout the addition of the D-biotin acid chloride. Stirring was continued for an additional 30 minutes, while the mixture was allowed to warm to room temperature. The mixture was then centrifuged, the blue aqueous layer removed, and the chloroform washed with water and dilute hydrochloric acid. All the washings were then combined with the original blue aqueous mother liquor, which was adjusted to pH 2 with hydrochloric acid.

Gaseous hydrogen sulfide is bubbled into the reaction mixture whereupon copper sulfide precipitates. The mixture is filtered through Supercel and the filtrate concentrated to dryness at reduced pressure. The residue was extracted with water and this extract was then subjected to a 10 plate countercurrent distribution, using an organic layer of equal parts chloroform and ortho-cresol and an aqueous layer of equal volume adjusted to pH 3 with hydrochloric acid. Plates 4–9 contained most of the ninhydrin-reacting material. The contents of these plates were combined, ten volumes of petroleum ether added, and the solution extracted with water. The combined aqueous extracts were washed with ether and lyophilized. The colorless residue was dissolved in water, and acetone added to cloud the solution. ε-N-(D-biotinyl)-L-lysine was obtained as a colorless crystalline precipitate.

A quantity of 1.58 g. of crude ε-N-(D-biotinyl)-L-lysine obtained from several preparations in the above manner was subjected to a 12 plate countercurrent distribution, using the same solvent system as above. Plates 4–8 contained 715 mg. of colorless crystalline ε-N-(D-biotinyl)-L-lysine which on rapid recrystallization from water gave 498 mg. of crystalline product, having a melting point of 228–229° C. We have found that crystalline biocytin having a melting point of 228–229° C. was obtained when the compound was allowed to crystallize rapidly from water, aqueous acetone or aqueous methanol. However, when the crystalline biocytin was allowed to separate slowly, it was found to sinter slightly at 227° C., and melt at 245–252° with decomposition.

*Analysis.*—Calculated for $C_{16}H_{28}N_4O_4S$: C, 51.59; H, 7.58; N, 15.04. Found: C, 51.44; H, 7.35; N, 14.83.

It should be understood that various changes may be made in our process as herein described without affecting the results attained. Thus, various modifications of conditions as to time, temperature, alkalinity, acidity, etc., and various changes in procedure differing from those herein given as illustrative of the preferred embodiments of our invention may be made without departing from the scope thereof.

We claim:

1. The process that comprises intimately contacting an alkaline aqueous solution of L-lysine copper complex with a suspension of biotin acid halide in a water-immiscible inert organic solvent, maintaining the pH of the reaction mixture at approximately pH 8, and the temperature at between −15° C. and room temperature to form ε-N-(D-biotinyl)-L-lysine copper complex, acidifying the latter compound with an inorganic mineral acid, removing the copper as an insoluble salt and recovering ε-N-(D-biotinyl)-L-lysine.

2. The process that comprises intimately contacting an alkaline aqueous solution of L-lysine copper complex with a suspension of biotin acid chloride in chloroform, maintaining the pH of the reaction mixture at pH 8 by the addition of sodium hydroxide at a temperature between −15° C. and room temperature to form ε-N-(D-biotinyl)-L-lysine copper complex, reacting the latter compound with hydrochloric acid, removing the copper as the insoluble salt and recovering ε-N-(D-biotinyl)-L-lysine.

3. The process that comprises intimately contacting an alkaline aqueous solution of L-lysine copper complex with a suspension of biotin acid halide in a water-immiscible inert organic solvent at a pH of about 8 and at a temperature between −15° C. and room temperature to form ε-N-(D-biotinyl)-L-lysine copper complex.

4. The process that comprises intimately contacting an alkaline aqueous solution of L-lysine copper complex with biotin acid chloride suspended in chloroform, maintaining the pH of the reaction mixture at pH 8 by the addition of aqueous sodium hydroxide at a temperature between −15° C. and room temperature to form ε-N-(D-biotinyl)-L-lysine copper complex.

References Cited in the file of this patent

UNITED STATES PATENTS

| | | |
|---|---|---|
| 2,462,124 | Neuberg et al. | Feb. 22, 1949 |
| 2,519,530 | Wolf | Aug. 22, 1950 |

OTHER REFERENCES

Kurtz, J.: Biol. Chem., vol. 180, pp. 1253–67 (1949).
Science, vol. 114, December 14, 1951, pp. 635–36.
Wright et al.: JACS 72, February 1950, p. 1048.